United States Patent

Remlaoui

[11] Patent Number: 5,209,057
[45] Date of Patent: May 11, 1993

[54] RACK AND PINION ACTUATION FOR AN AIRCRAFT ENGINE THRUST REVERSER

[75] Inventor: Jihad I. Remlaoui, Oceanside, Calif.

[73] Assignee: Rohr, Inc., Chula Vista, Calif.

[21] Appl. No.: 780,945

[22] Filed: Oct. 23, 1991

[51] Int. Cl.[5] .................................................. F02K 1/00
[52] U.S. Cl. ...................................... 60/226.2; 60/230; 74/89.18; 239/265.29; 244/110 B
[58] Field of Search .............................. 60/226.2, 230; 74/89.18; 244/213, 214, 215, 216, 110 B, 12.5, 23 D; 239/265.29, 265.27, 265.25

[56] References Cited

U.S. PATENT DOCUMENTS

| | | | |
|---|---|---|---|
| 3,500,646 | 3/1970 | Hom et al. | 239/265.29 |
| 3,503,211 | 3/1970 | Medawar et al. | 239/265.29 |
| 4,356,973 | 11/1982 | Lawson | 60/226.2 |
| 4,407,120 | 10/1983 | Timms | 60/226.2 |
| 4,527,391 | 7/1985 | Marx et al. | 60/226.2 |
| 4,819,876 | 4/1989 | Thayer | 60/226.2 |

*Primary Examiner*—Richard A. Bertsch
*Assistant Examiner*—Laleh Jalali
*Attorney, Agent, or Firm*—Patrick J. Schlesinger; Frank D. Gilliam

[57] ABSTRACT

A thrust reverser system for fan jet type aircraft gas turbine engines using a rack and pinion arrangement for moving blocker doors between the stowed and deployed positions. Blocker doors fill a plurality of circumferentially arranged openings.

13 Claims, 4 Drawing Sheets

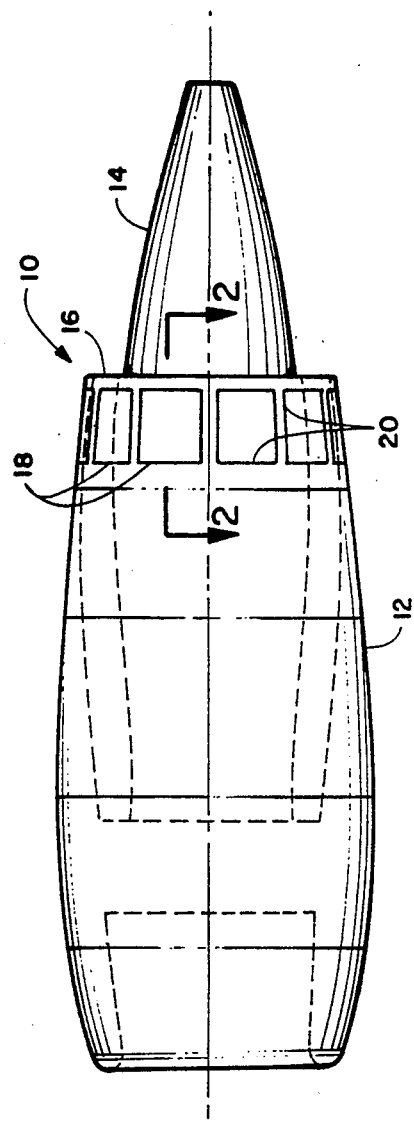
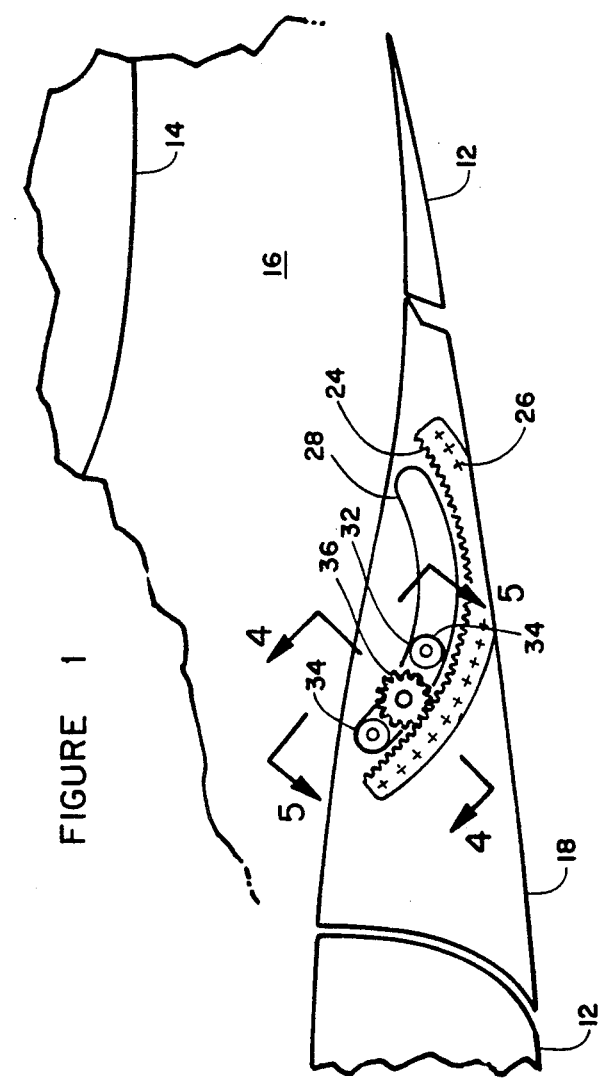
FIGURE 1
FIGURE 2

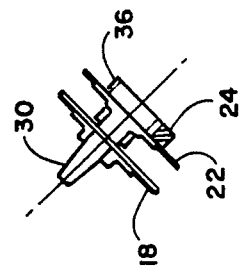
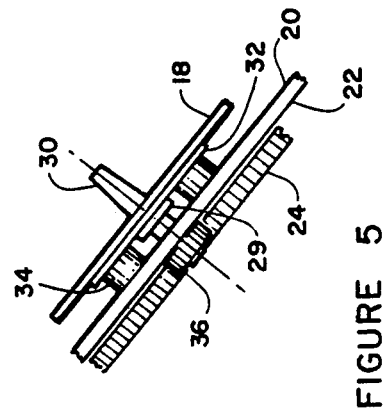
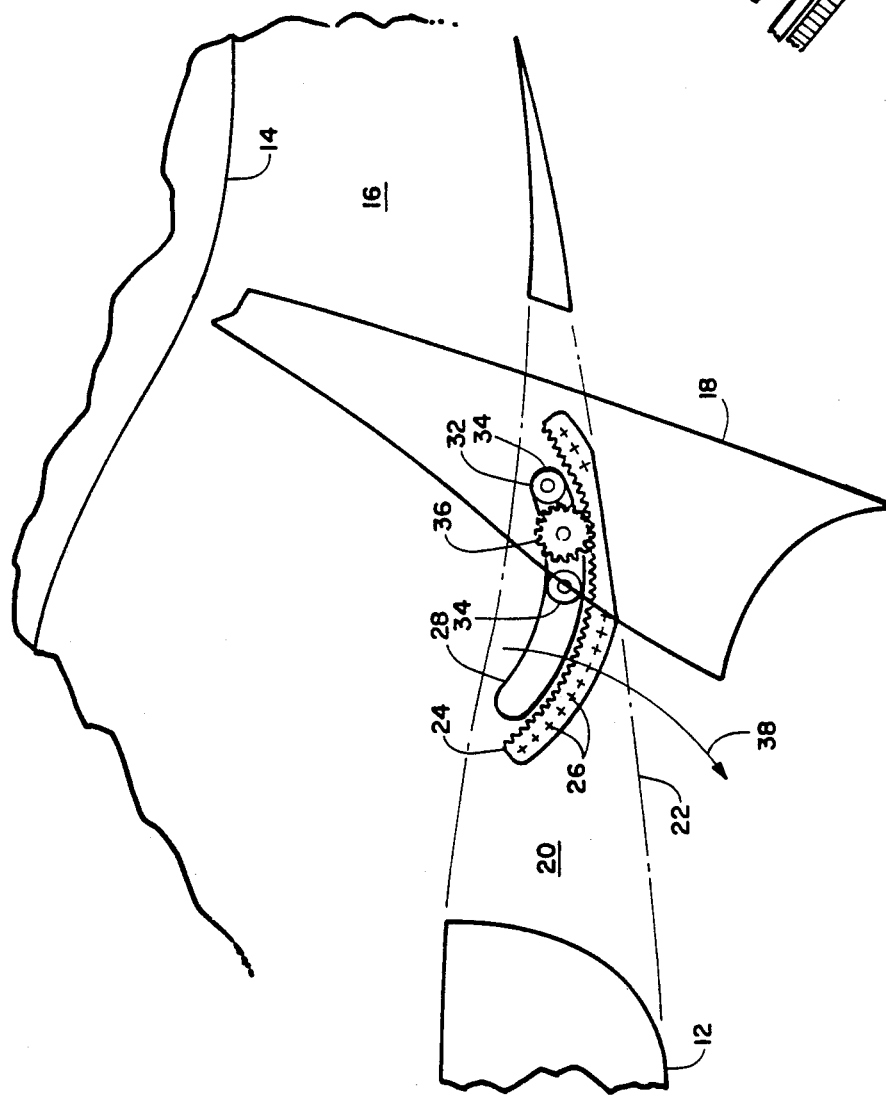

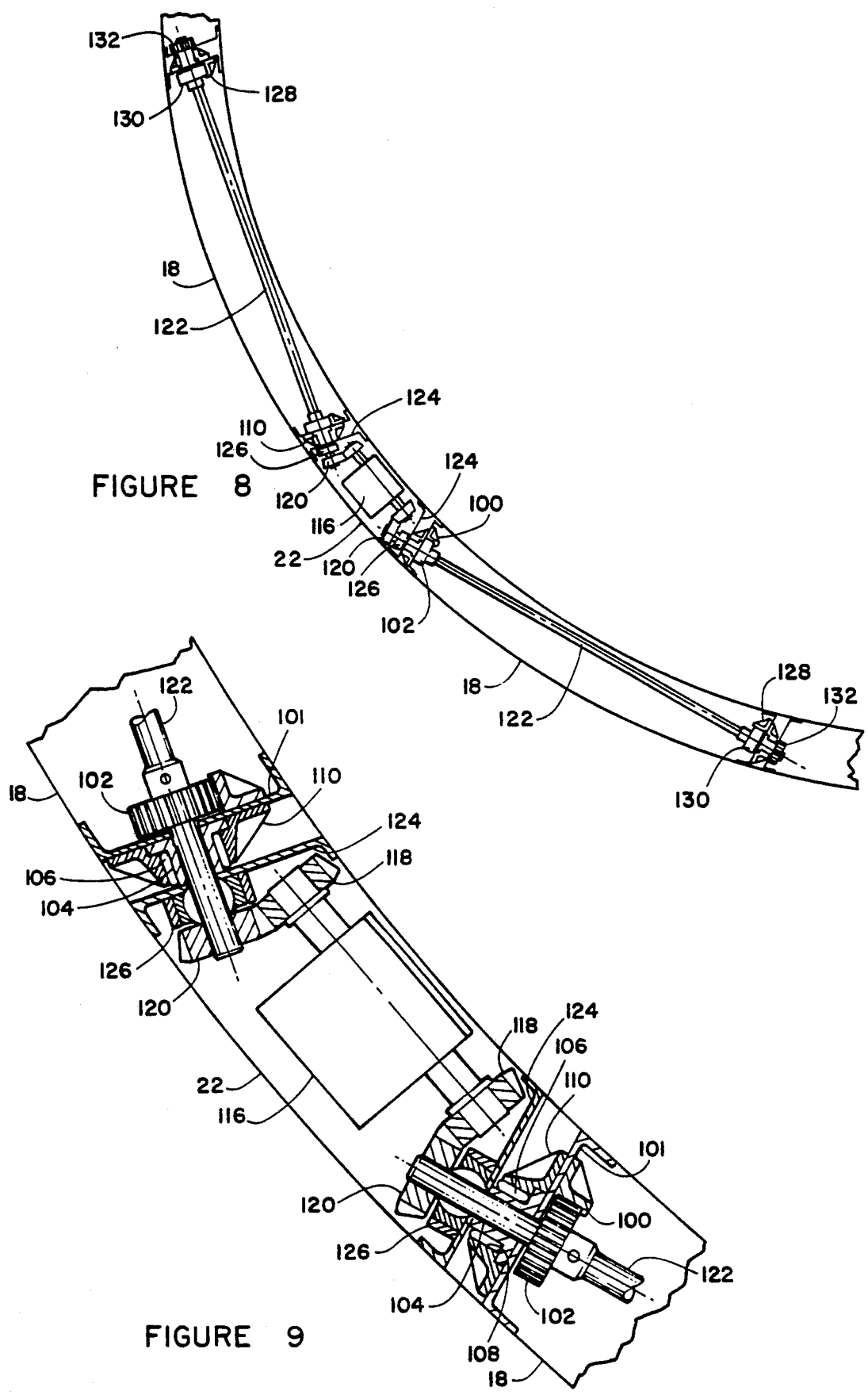

RACK AND PINION ACTUATION FOR AN AIRCRAFT ENGINE THRUST REVERSER

BACKGROUND OF THE INVENTION

This invention relates in general to pivot door type thrust reversers for aircraft turbine engines and, more particularly, to such a thrust reverser having rack and pinion actuation.

Modern aircraft fan-jet engines have a nacelle or shroud surrounding the engine, spaced outwardly from the core engine cowl to define an annular passage or duct for flow of air rearwardly from the outer portion of an enlarged axial flow compressor. In this type of engine, a large proportion of the total thrust is developed by the reaction to the air driven rearward by the fan and the balance results from ejection of the exhaust gas stream from the engine.

Aircraft using gas turbine engines tend to have high landing speeds, placing great stress on wheel braking systems and requiring very long runways. To reduce this braking requirement and permit use of shorter runways, means are now provided in such engines for reversing a major portion of engine thrust during the landing roll. Many different types of thrust reversers have been designed, of varying effectiveness.

With fan-jet engines, it is possible to block and reverse substantially all of the fan flow without excessive stress on the system, since a large part of the flow, core flow, continues through the engine. In some cases, sufficient reverse flow can be obtained by blocking only a substantial portion of the fan flow.

One type of thrust reverser often used in non-fan type turbine engines, uses a pair of large sturdy clam-shell like blocker doors which swing directly behind the jet exit nozzle and diverge forwardly to reverse thrust. This system must be very heavy and strong. Very complex and sturdy actuators are required for this system, which also tends to undesirably direct much of the reverse flow against aircraft structures.

Another type of thrust reverser uses cascade sets in the sidewalls of the engine nacelle with devices for uncovering the cascades to direct air flow through the cascades, which turn the airflow in a forward direction. A portion of the nacelle wall that covers the cascade set in flight is moved rearwardly by a jack screw or rack and pinon gear set, as described by Sawson in U.S. Pat. No. 4,356,973. Typical cascade type reversers include those disclosed by Montgomery in U.S. Pat. No. 4,145,877 and Hom et al in U.S. Pat. No. 3,500,646. While often effective in fan-jet engines, these systems are mechanically complex, requiring a great many cooperating components.

Still another design uses pivotable doors lying in opening in the sidewall of the shroud or nacelle which pivot outwardly while a second set of doors pivot inwardly to block flow of air through the duct and direct it to the outwardly extending doors which direct air flow forwardly. These dual doors are moved independently by a variety of devices, such as the rack and pinon described by Timms in U.S. Pat. No. 4,407,120. Typical of these dual door systems is the system disclosed by Ellis in U.S. Pat. No. 3,612,401. These systems, while useful in fan-jet engines, tend to be heavy and mechanically complex.

Yet another design uses a plurality of pivotable doors located in openings arranged radially around the shroud. Each door pivots so that one end contacts the engine cowl blocking air flow through the annular duct while the other end extends outside the nacelle in a direction directing airflow in a reverse direction. Typical of these are the systems disclosed by Maison et al in U.S. Pat. No. 3,605,411 and Fournier et al in U.S. Pat. No. 4,485,970. These thrust reversers tend to have greater mechanical simplicity than other systems. However, they often require complex actuation systems which may include components extending into the airflow path during normal engine operation and during reverser deployment resulting in undesirable drag.

Thus, there is a continuing need for improved thrust reversing systems for use in aircraft turbine engines, which combine highly effective flow reversal with low cost, light weight, mechanically simple actuation systems that do not impede air flow during normal engine operation and the reverse mode.

SUMMARY OF THE INVENTION

It is, therefore, an object of this invention to provide a thrust reverser system for fan jet engines which overcomes the above-noted problems. Another object of this invention is to provide a thrust reverser system of improved simplicity and light weight. A further object of this invention is to provide a thrust reverser actuation system that does not intrude into the air flow stream in either the deployed or the stored position.

The above objects, and others, are accomplished in accordance with this invention by a thrust reverser system for use in aircraft turbine engines which includes a plurality of blocker doors stowed in circumferentially located spaced openings in the engine nacelle wall during normal flight and which are rotatable and extendable by an actuator to a deployed position in which the forward edge of each door extends outwardly and forwardly of the aft opening edge and the aft door edge extends into duct air flow blocking a major portion of the duct air flow and directing it outwardly and forwardly of the engine.

Each door assembly and actuator includes a blocker door sized to fill an opening in the engine nacelle near the aft end of the nacelle, with the inner and outer door walls conforming in a streamlined manner to the inner and outer nacelle walls, with no actuator parts extending into the airflow inside or outside the nacelle, to assure the least possible drag during normal aircraft flight operation and during the thrust reversal mode. Two substantially identical actuation systems are located at each of the longitudinal sides of each door, extending between the doors and the nacelle island structure between adjacent doors.

A correspondingly curved, adjacent, rack gear and track are secured to the island structure. A shaft passes through the door edge and carries on its end a pinion gear adapted to engage and be driven along the rack. A pair of spaced wheels or curved sliders are mounted on a bracket next to the pinion gear to form a traveler secured to the door and adapted to move along the track without rotating relative to the track. The shaft passes through the bracket and rotates relative thereto. The bracket is secured to the door for movement therewith. Drive means such as an electric or hydraulic motor, is mounted on the door, preferably along the door centerline, to drive said shafts extending to opposite door edges.

In use, with the door stowed, the drive means is operated. The pinion moves along the curved rack, carrying the wheels, bracket and door with it. The track configuration is chosen so that the door moves aft in the nacelle opening and rotates to the reverse thrust direction.

BRIEF DESCRIPTION OF THE DRAWING

Details of the invention, and of preferred embodiments thereof, will be further understood upon reference to the drawing, wherein:

FIG. 1 is a schematic side view of a fan jet engine incorporating the thrust reverser of this invention;

FIG. 2 is a schematic section view taken on line 2—2 in FIG. 1, showing a first embodiment of the door in the stowed position;

FIG. 3 is a schematic section view corresponding to FIG. 2, but showing the door in the deployed position;

FIG. 4 is a detail section view taken on line 4—4 in FIG. 2;

FIG. 5 is a schematic detail view taken on line 5—5 in FIG. 2;

FIG. 8 is a schematic section view of the drive system taken on line 8—8 in FIG. 7; and FIG. 9 is a detail view of the drive shown in FIG. 8.

DETAILED DESCRIPTION OF PREFERRED EMBODIMENTS

Figure 6:
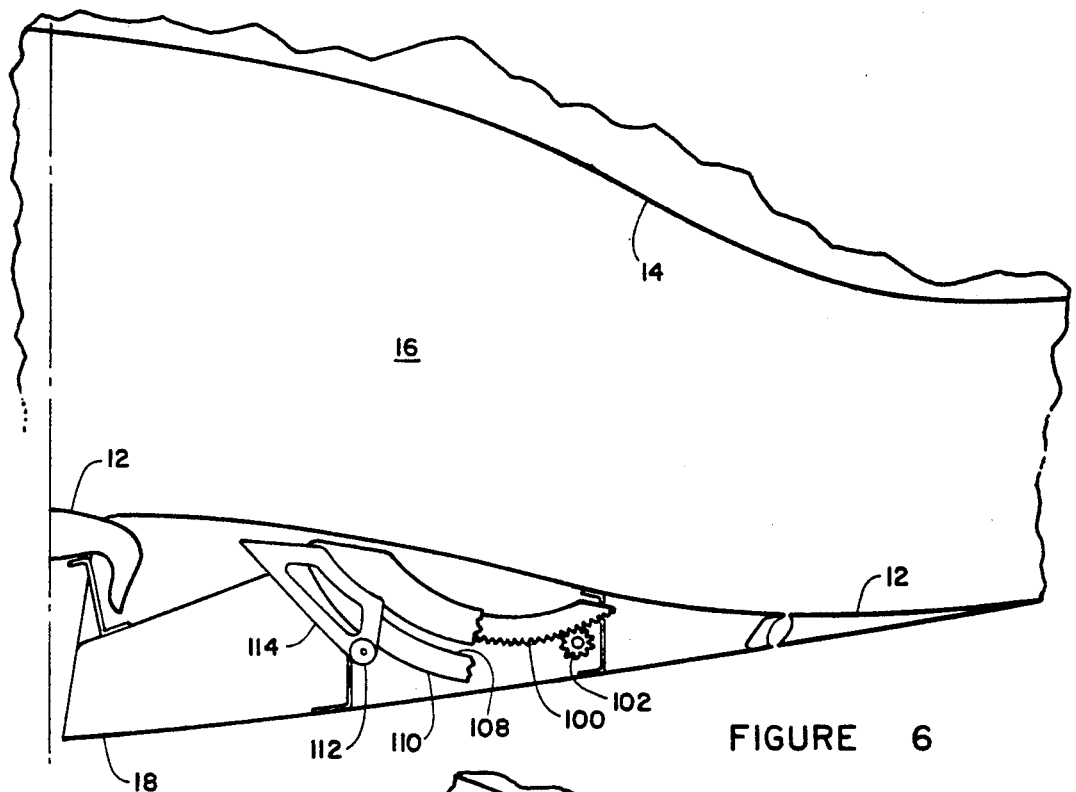
FIG. 6 is a schematic section view of a second embodiment of the door in the stowed position, taken on line 6—6 in FIG. 1.

Referring now to FIG. 1, there is seen a schematic side view of a typical fan jet aircraft engine 10. Engine 10 basically comprises a nacelle 12 and an engine core 14. A duct 16 is formed between nacelle 12 and core 14 through which fan airflow passes. Near the aft end of nacelle 12 is located a circumferential array of blocker doors 18, each filling an opening 20 through the nacelle and separated by an island 19. In the stowed or normal engine operation position shown in FIG. 1, each blocker door 18 fills the corresponding opening and provides a streamlined inner and outer surface, permitting free air flow along the inner and outer nacelle surfaces. When deployed, doors 18 extend outwardly and forwardly of the aft edge of openings 20, with the aft ends of the doors pivoted toward core 14, to direct fan air flow through duct 16 in a reverse direction. Islands 22 separate and support adjacent doors and carry part of the door actuation system, as detailed below.

A first embodiment of an actuation system for a door 18 is schematically illustrated in FIGS. 2 and 3, which are schematic section views taken on line 2—2 in FIG. 1, with the door in a stowed and a deployed position, respectively. These views are from within the door 18 looking toward the adjacent island 22 on which the door is supported. The detail views of FIGS. 4 and 5 show the construction of the actuation system in greater detail.

Referring now to FIGS. 2, 4 and 5, the thrust reverser is shown in the stowed position. A curved rack 24 is fastened to island 22 by bolts 26 or the like on the inside of the island wall. A curved track 28 corresponding to rack 24 is fastened to the outside of the island wall, directly opposite the side wall of door 18. The effective hinge line is at the center of the track and rack, so that the effective hinge line can be selected by selecting the radii of the track and rack. A drive shaft 30 extends from a drive means (not shown), such as a conventional electric motor, at the center of door 18, which drives actuator assemblies on both sides of the door. Drive shaft 30 passes through a bearing 29 (FIG. 5) at the center of a bracket 32 fastened to door 18, that carries two sliders 34 (which may be wheels, sliding shoes or the like) that ride along track 28. A pinion gear 36 is secured to the end of drive shaft 30 for engagement with rack 24.

As pinon gear 36 is rotated in a clockwise direction as seen in FIG. 2, the pinon moves along the rack 24 carrying the door with it. Since bracket 32 is fastened to door 18, as the orientation of bracket and sliders 34 changes from the position shown in FIG. 2 to that shown in FIG. 3, the entire door correspondingly changes orientation and pivots into the deployed position shown in FIG. 3.

When fully deployed, doors 18 substantially block air flow through duct 16 and direct it out and in a reverse direction, as indicated by arrow 38. To return door 18 to the stowed position of FIG. 2, pinion 36 is rotated in a counter-clockwise direction by drive shaft 30, so that pinion 36 moves back along rack 24 and the sliders 34 on bracket 32 moves along track 28, with bracket secured to door 18 so that the door pivots back to the stowed position.

This is a very simple mechanism which is entirely out of the air flow through duct 16 during normal flight operation and out of the air flow indicated by arrow 38 during reverse thrust operation.

Figure 7:
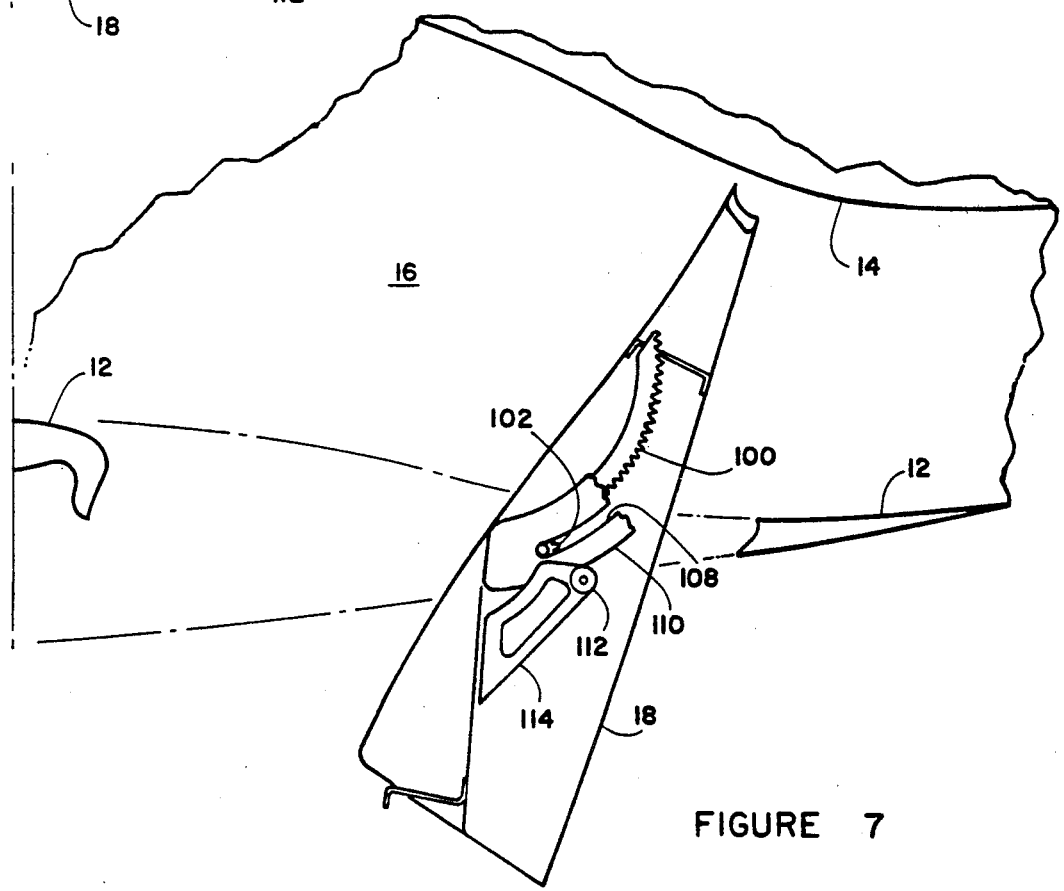
FIG. 7 is a schematic section view of the second embodiment, taken as in FIG. 6 but with the door in the deployed position.

A second preferred embodiment is shown in FIGS. 6-9. In this embodiment, the pinion gear is fixedly mounted to the island structure 22 and the rack moves with the door 18 between stowed and deployed positions shown in FIGS. 6 and 7, respectively.

In this embodiment, a rack gear 100 is secured to wall 101 (FIG. 9) that closes the edge of door 18 adjacent to island 22. A pinion gear 102 is mounted on a drive system (as detailed in FIGS. 8 and 9) within door 18 and extends out of the door edge into engagement with rack 100. The shaft 104 of pinion 102 is rotatably surrounded by a slider 106 adapted to slide along a curved slot-like track 108 in a bracket 110 that has a shape corresponding to curved rack 100 (best seen in FIGS. 6 and 9). Bracket 110 is secured to wall 101 opposite rack 100. A guide means 112, typically a rotatable roller, mounted on a bracket 114 secured to door 18 rides against the outer edge of curved bracket 110 which also is shaped to conform to the shape of rack 100, thus maintaining alignment between pinion 102 and guide 112 as the door moves between the stowed and deployed positions shown in FIGS. 6 and 7.

As seen in FIGS. 8 and 9, the drive system includes a drive motor 116 adapted to rotate gears 118. Gears 118 engage gears 120 mounted on shafts 122 which extend entirely across door 18. One drive motor 116 thus drives one pair of adjacent doors 18 between the stowed and deployed positions. Shaft 122 is mounted in a bearing 126 on a bracket 124 that closes the edges of island 2 adjacent to door 18. Bearings 126 are preferably spherical bearings to accommodate any slight misalignment.

The second ends of shaft 122 include a pinion 130 engaging a rack 128 identical to rack 100 and pinon 102. The end of shaft 122 is terminated in a bearing 132, substantially identical with bearing 126. Thus, one motor 116 drives two adjacent doors 18.

As drive motor 116 rotates gears 118, gears 120 are rotated to rotate pinions 102, causing rack 100 to move. Track 108 moves correspondingly against slider 106, moving door 18 to the deployed or stowed position, as selected by the direction of rotation of gear 118.

Other applications, variations and ramifications of this invention will occur to those skilled in the art upon reading this disclosure. Those are intended to be included within the scope of this invention, as defined in the appended claims.

I claim:

1. A thrust reverser system for a fan type turbine aircraft engine which comprises:
   a plurality of blocker doors positioned in circumferentially arranged openings separated by islands, near the aft end of the nacelle of a fan type aircraft engine;
   said islands each having a first wall adjacent to the adjacent door;
   said doors each having a second wall adjacent to the island first wall;
   a rack gear secured to one of said first and second walls;
   a correspondingly configured track secured to said one of said first and second walls;
   a pinion gear in engagement with said rack and rotatably secured to the other of said first and second walls;
   guide means engaging said track to cause said door to move and pivot in accordance with the relative position of said pinion and rack;
   whereby as said pinion gear is rotated in a first direction, said pinion and rack move relative to each other and said guide means is moved relative to said track in a direction moving said door from the stowed to the deployed position and when rotated in the opposite direction returning said door to the stowed position, said door pivoting in accordance with the orientation of said guide means relative to said track.

2. The thrust reverser system according to claim 1 wherein said pinion gear is mounted on said door for movement therewith and said rack gear is fixedly mounted on said island structure.

3. The thrust reverser system according to claim 2 wherein said guide means comprises:
   said track secured to the wall of said island opposite said door;
   a bracket secured to the outside wall of said door opposite said track; and
   two spaced sliders on said bracket adapted to ride along said track.

4. The thrust reverser system according to claim 3 wherein said sliders comprise rotatable wheels.

5. The thrust reverser system according to claim 1 wherein said rack gear is mounted on said door for movement therewith and said pinion gear rotatably mounted on a fixed bracket on said island structure.

6. A thrust reverser system for a fan type turbine aircraft engine which comprises:
   a plurality of blocker doors positioned in circumferentially arranged openings separated by islands, near the aft end of the nacelle of a fan type aircraft engine;
   a rack gear secured to the inside of the wall of said island adjacent to a blocker door;
   a correspondingly configured track secured to the outside of said island wall;
   a drive shaft extending from within said door through the wall of said door to a position adjacent said rack;
   a pinion gear secured to the end of said drive shaft in engagement with said rack; and
   guide means secured to said door and engaging said track to cause said door to move and pivot in accordance with the position of said guide means;
   whereby as said pinion gear is rotated in a first direction, said pinion gear moves relative to said rack gear and said guide means moves along said track in a direction moving said door from the stowed to the deployed position and when rotated in the opposite direction returning said door to the stowed position, said door pivoting in accordance with the orientation of said guide means relative to said track.

7. The thrust reverser system according to claim 6 wherein said guide means comprises:
   a bracket secured to the outside wall of said door opposite said track; and
   two spaced sliders on said bracket adapted to ride along said track.

8. The thrust reverser system according to claim 7 wherein said sliders comprise rotatable wheels.

9. A thrust reverser system for a fan jet aircraft engine which comprises:
   a plurality of blocker doors positioned in circumferentially arranged openings separated by islands, near the aft end of the nacelle of a fan jet aircraft engine;
   a curved rack gear secured to the inside of the wall of said island adjacent to a blocker door;
   a correspondingly curved track secured to the outside of said island wall;
   a bracket secured to the outside wall of said door opposite said track;
   two spaced sliders on said bracket adapted to ride along said track;
   a drive shaft extending from within said door through the wall of said door to a position adjacent said rack; and
   a pinion gear secured to the end of said drive shaft in engagement with said rack;
   whereby as said pinion gear is rotated in a first direction, said sliders are moved along said track in a direction moving said door from the stowed to the deployed position and when rotated in the opposite direction returning said door to the stowed position, said door pivoting in accordance with the orientation of said bracket relative to said track.

10. The thrust reverser system according to claim 9 wherein said sliders comprise rotatable wheels.

11. A thrust reverser system for a fan jet aircraft engine which comprises:
   a plurality of blocker doors positioned in circumferentially arranged openings separated by islands, near the aft end of the nacelle of a fan jet aircraft engine;
   a curved rack gear secured to the wall of said blocker door adjacent said island;
   a pinion gear mounted on a shaft within said door, said pinion gear in engagement with said rack gear;
   a curved track having an inner and an outer surface configuration corresponding to said curved rack gear and secured to said door;
   a slider on said shaft adjacent to move along said track inner surface;
   a drive gear fixed to said shaft and extending into said island;

drive means in said island adapted to rotate said drive gear to rotate said pinion gear and cause said rack gear to move relative to said pinion gear;

guide means on said door adapted to move along said track outer surface;

whereby as said pinion gear is rotated in a first direction, said rack gear and said guide means are moved in a direction moving said door from the stowed to the deployed position and when rotated in the opposite direction returning said door to the stowed position, said door pivoting in accordance with the orientation of said guide means relative to said track.

12. The thrust reverser system according to claim 11 wherein one drive means is positioned in alternate island structures between doors, with each drive means driving pinion gears in adjacent doors.

13. The thrust reverser system according to claim 12 wherein said drive means includes a drive shaft extending entirely across each door, with a set of said rack and pinion at each door edge, said drive means driving the pinion at only one door edge.

* * * * *